(12) United States Patent
Kishimoto et al.

(10) Patent No.: US 10,834,923 B2
(45) Date of Patent: Nov. 17, 2020

(54) AGENT FOR IMPROVING PLANT GROWTH AND METHOD FOR PRODUCING PLANT USING SAME

(71) Applicant: FUSO CHEMICAL CO., LTD., Osaka (JP)

(72) Inventors: Hiroyuki Kishimoto, Osaka (JP); Shigetoyo Matsumura, Osaka (JP); Takaya Nishinokawa, Osaka (JP); Mari Kado, Osaka (JP); Akinori Hoshino, Osaka (JP)

(73) Assignee: FUSO CHEMICAL CO., LTD., Osaka (JP)

( * ) Notice: Subject to any disclaimer, the term of this patent is extended or adjusted under 35 U.S.C. 154(b) by 0 days.

(21) Appl. No.: 16/250,647

(22) Filed: Jan. 17, 2019

(65) Prior Publication Data

US 2019/0150436 A1 May 23, 2019

Related U.S. Application Data

(63) Continuation of application No. 15/548,684, filed as application No. PCT/JP2016/053431 on Feb. 4, 2016, now abandoned.

(30) Foreign Application Priority Data

Feb. 6, 2015 (JP) .................. 2015-021848

(51) Int. Cl.
| | |
|---|---|
| *A01N 35/06* | (2006.01) |
| *A01N 27/00* | (2006.01) |
| *A01N 65/48* | (2009.01) |
| *A01G 7/06* | (2006.01) |

(52) U.S. Cl.
CPC .............. *A01N 35/06* (2013.01); *A01G 7/06* (2013.01); *A01N 27/00* (2013.01); *A01N 65/48* (2013.01)

(58) Field of Classification Search
None
See application file for complete search history.

(56) References Cited

U.S. PATENT DOCUMENTS

| | | | | |
|---|---|---|---|---|
| 8,968,798 | B2 ‡ | 3/2015 | Green ................... | A01N 27/00 424/72 |
| 2010/0255124 | A1 ‡ | 10/2010 | Green ................... | A01N 27/00 424/72 |
| 2013/0212744 | A1 ‡ | 8/2013 | Monir ................... | A01N 41/10 800/29 |
| 2013/0224315 | A1 ‡ | 8/2013 | Green ................... | A01N 27/00 424/72 |
| 2014/0364316 | A1 ‡ | 12/2014 | Hara ..................... | A01G 7/06 504/24 |
| 2015/0173356 | A1 ‡ | 6/2015 | Green ................... | A01N 27/00 514/54 |

FOREIGN PATENT DOCUMENTS

| | | | |
|---|---|---|---|
| FR | 2985425 | | 7/2013 |
| FR | 2985425 | A1 ‡ | 7/2013 |
| JP | 05201821 | ‡ | 8/1993 |
| JP | 07087845 | ‡ | 4/1995 |
| JP | 2002155001 | A * | 5/2002 |
| JP | 2002155001 | A2 | 5/2002 |
| JP | 2002155001 | A2 ‡ | 5/2002 |
| JP | 2003070442 | ‡ | 3/2003 |
| JP | 2003070442 | A * | 3/2003 |
| JP | 2005192534 | A2 ‡ | 7/2005 |
| JP | 2005192534 | A2 | 7/2005 |
| JP | 2007045709 | A2 | 2/2007 |
| JP | 2007045709 | A2 ‡ | 2/2007 |
| JP | 5544450 | ‡ | 7/2014 |
| JP | 5544450 | B1 | 7/2014 |
| WO | 2011134876 | A1 | 11/2011 |
| WO | WO-2011134876 | A1 ‡ | 11/2011 |

OTHER PUBLICATIONS

International Search Report dated Apr. 19, 2016 filed in PCT/JP2016/053431.‡

Field, J. A. et al., Determination of Essential Oils in Hops by Headspace Solid-Phase Microextraction, Journal of Agricultural and Food Chemistry, 1996, vol. 44, No. 7, pp. 1768-1772, entire text, particularly, p. 1768, left column, lines 15 to 25.; Cited in ISR.‡

Kalsi et al., "Cross Conjugated Terpenoid Ketones: A New Group of Plant Growth Regulators" Phytochemistry, 1978, vol. 17, pp. 576-577; English text; Cited in INOA.

Kitayama, "Attractive Reactivity of a Natural Product, Zerumbone", Bioscience, Biotechnology, and Biochemistry, 2011, 75 (2), pp. 199-207; English text; Cited in INOA.

Talwar et al., "A dramatic role of terpenoids in increasing rice production" Experientia 39, 1983, pp. 117-119; English text; Cited in INOA.

Indian Office Action (INOA) dated Feb. 26, 2020 for the corresponding Indian Patent Application No. 201717029403; English text.

\* cited by examiner
‡ imported from a related application

*Primary Examiner* — Alton N Pryor

(74) *Attorney, Agent, or Firm* — Rankin, Hill & Clark LLP

(57) ABSTRACT

This disclosure provides an agent for improving plant growth, the agent significantly improving resistances to a wide variety of stress possibly subjected to a plant, such as resistances to chemical stress and ultraviolet ray stress as well as resistances to temperature stress and dry stress, the agent having a high safety. This agent for improving plant growth alleviates an environmental stress on a plant, promotes plant growth, or a plant quality. This agent for improving plant growth contains, as its main ingredient, zerumbone, an analog of zerumbone, or a salt of zerumbone or the analog. Furthermore, in this agent for improving plant growth, the analog of zerumbone is α-humulene or β-caryophyllene.

6 Claims, 2 Drawing Sheets

(a) CONTROL (b) SPRAYED WITH ZERUMBONE

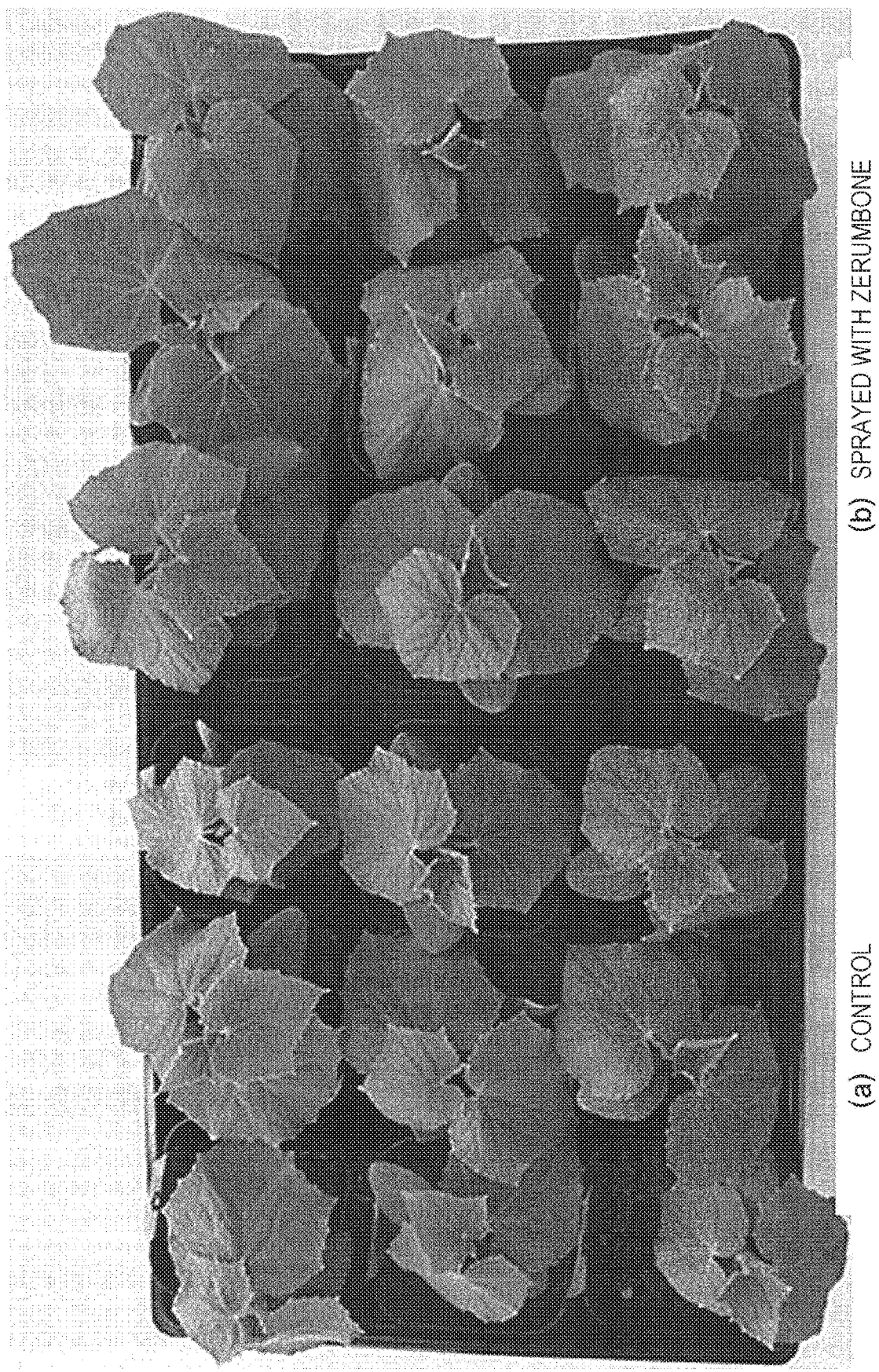

AGENT FOR IMPROVING PLANT GROWTH AND METHOD FOR PRODUCING PLANT USING SAME

TECHNICAL FIELD

The present disclosure relates to an agent for improving plant growth which makes a plant grow healthily, and to a method for producing a plant by use of the agent.

BACKGROUND ART

It is ideal that crops and ornamental plants are grown in optimal environments for the plants. Actually, however, the plant is subjected to various stresses due to, e.g., an environment change. For example, the plant may be subjected to temperature stress, such as high temperature stress or low temperature stress, and ultraviolet ray stress, due to drastic changes in the weather or unusual weather. Furthermore, the plant may be subjected to dry stress due to water shortage. Moreover, the plant may be seriously damaged by chemical stresses caused by an agrochemical or a chemical.

In addition to the above, there are many stresses inhibiting plant growth.

pH stress occurs because of, e.g., root rot caused by changes in pH of soil due to acid rain or a chemical fertilizer. Low oxygen stress occurs when breathing of a root is inhibited by immersion of the root in water due to a long rain or by too-hard soil.

There have been reported many cases where ammonia stress occurs due to too much fertilization.

An organic acid is widely used for growth promotion and disease prevention for a plant. However, the organic acid has a high cell permeability. Thus, adding an excessive amount of the organic acid to a plant gives a stress on the plant.

In addition to the above-described ultraviolet ray stress, light stress encompasses infrared ray stress and low sunshine stress, each of which also inhibits growth of a plant.

Furthermore, the growth of the plant is greatly inhibited also by disease stress caused by, e.g., bacteria and/or feeding damage stress caused by an insect pest.

A plant growing in a seacoast area is subjected to strong salt stress. Furthermore, use of underground water for irrigation may cause a salt damage.

There exist many kinds of stresses, such as a stress caused by a sudden change in a soil environment and/or the like due to transplantation and physical stress due to a strong wind in a typhoon.

These stresses are factors that inhibit plant growth. In the case of crops, a serious problem of quality deterioration or yield reduction is caused by them. In order to alleviate such environmental stresses, greenhouse cultivation or the like is employed so that the environmental factors may be kept as constant as possible. However, this demands a large facility investment, and increases a maintenance cost, thereby resulting in a burden on a cost aspect.

A seasonal environmental stress is a factor that limits a cultivation period. This elongates an idling period, thereby increasing a production cost. In another case, the seasonal environmental stress may be a factor that limits a species of a plant to be cultivated.

Furthermore, due to the environmental stresses, plant growth may be delayed, and accordingly a cultivation period may be increased. This causes a problem of reducing a farmland turnover rate.

In order to solve the above problems, researches are conducted on an agent for giving a plant an environmental stress resistance. For example, a drug composition containing an enzymatically hydrolyzed product of yeast cell wall has been found to have an effect of giving a plant an environmental stress resistance (for example, see Patent Literature 1).

Meanwhile, it has been reported that sanguinarine derived from *Macleaya cordata* further improves plant's resistances to high temperature stress and dry stress (for example, see Patent Literature 2).

CITATION LIST

Patent Literature

PATENT LITERATURE 1: JP-A-2007-45709
PATENT LITERATURE 2: Japanese Patent No. 5544450

SUMMARY OF THE INVENTION

Problems to be Solved by the Invention

The agents disclosed in Patent Literatures 1 and 2 have been confirmed to have the effect of improving the plant's resistances to the environmental stresses. However, in actual cultivation of a crop, the plant may be subjected to a greater stress. Therefore, there is a demand for an agent capable of further improving the resistances. Also, there is a demand for an agent capable of improving not only the resistances to temperature stress and dry stress but also resistances to a wider range of stresses such as chemical stress and ultraviolet ray stress.

Furthermore, regarding the agent disclosed in Patent Literature 1, an active ingredient is not specified, and thus there is a concern about its safety. Regarding the agent disclosed in Patent Literature 2, an active ingredient is alkaloid, which is highly toxic, and thus its safety is a concern, too.

An object of the present disclosure is to solve the foregoing problems. Namely, the present disclosure provides an agent which gives a plant strong resistances to all various kinds of environmental stresses on the plant and which has a high safety. Alternatively, the present disclosure provides an agent which promotes plant growth or improves a plant quality.

Solution to the Problems

An agent for improving plant growth according to the present disclosure alleviates an environmental stress on a plant, promotes plant growth, or improves a plant quality. The agent for improving plant growth according to the present disclosure contains, as its main ingredient, zerumbone, an analog of zerumbone, or a salt of zerumbone or the analog.

Effects of the Invention

The agent for improving plant growth according to the present disclosure is capable of addressing all various kinds of environmental stresses on a plant. Furthermore, the present agent for improving plant growth gives a plant a stronger stress resistance. Alternatively, the present agent for improving plant growth promotes plant growth or improves a plant quality. Furthermore, a main ingredient of the present agent for improving plant growth is a natural product contained in edible plants. Thus, this agent secures a high safety.

BRIEF DESCRIPTION OF THE DRAWINGS

FIG. 2 shows a photograph indicating states of cucumber seedlings in a verification experiment for anti-dry stress.

DESCRIPTION OF THE EMBODIMENTS

Figure 1:
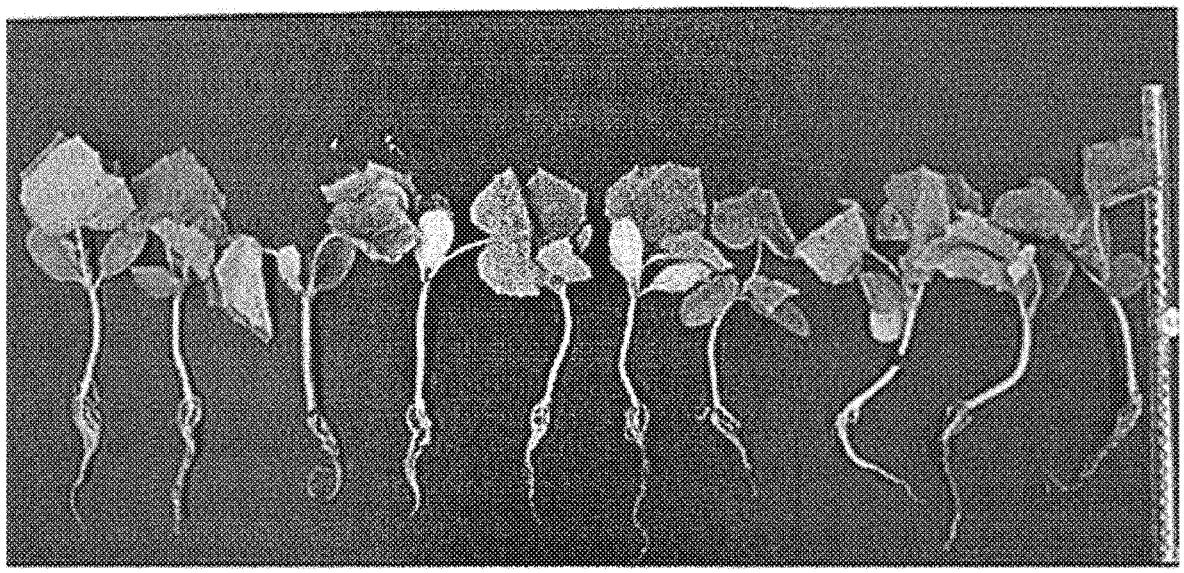
FIG. 1 shows photographs each indicating a state of cucumber seedlings in a verification experiment for anti-high temperature stress.
Figure 1:
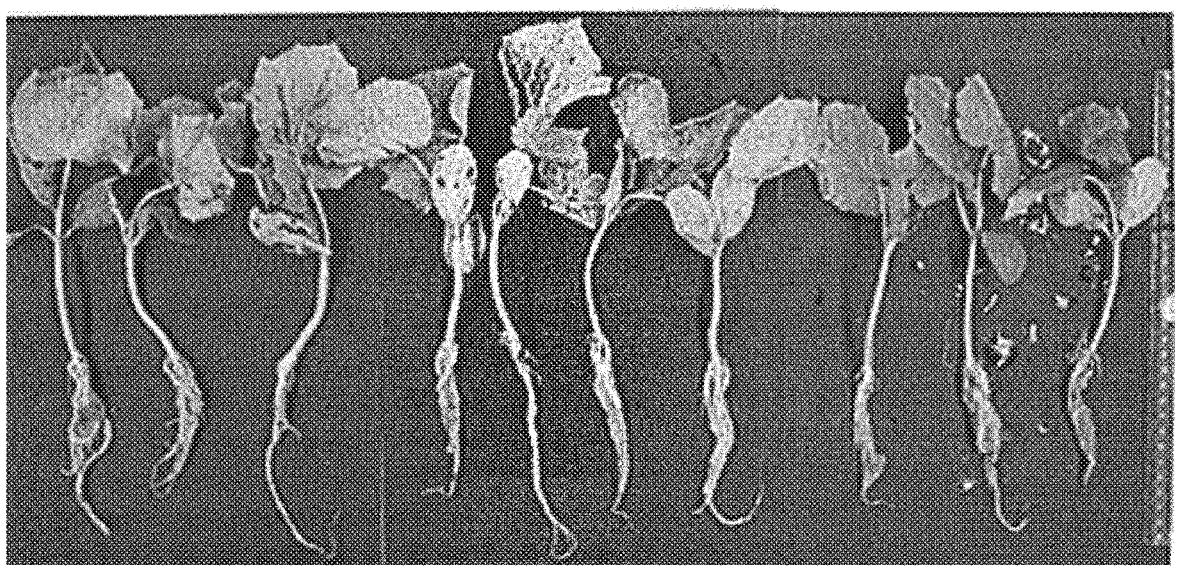

The following describes results of experiments conducted to confirm details, new efficacies, and the like of an agent for improving plant growth according to the present disclosure. Note that the description below discloses preferred embodiments of the present disclosure, and the present disclosure is not limited to the embodiments.

Note that the agent for improving plant growth according to the present disclosure alleviates various stresses on a plant, promotes plant growth, or improves a plant quality. As indicated in the below-described verification experiments, the "various stresses" herein refers to almost all kinds of stresses that may be subjected to a plant, for example, a temperature stress, a chemical stress, a light stress, a dry stress, a pH stress, a salt stress, a low oxygen stress, a feeding damage stress, and a physical stress. These stresses also include a stress caused by a disease. Namely, the present agent may also have an effect of disease prevention or improvement of a healing power.

The agent for improving plant growth according to the present disclosure is sesquiterpenes such as zerumbone, α-humulene, and β-caryophyllene. Sesquiterpenes are natural products contained in edible plants, and thus have a high safety.

Zerumbone is a type of cyclic sesquiterpene. An essential oil component of wild ginger contains 80% to 90% of zerumbone. α-humulene and β-caryophyllene, which is an isomer of α-humulene, are analogues of zerumbone. An analog has molecular biological characteristics, such as receptor binding characteristics, and a structure analogous to those of another one. Thus, the analog exhibits very similar properties to those of another one. However, the analog is a different compound from another one. Furthermore, the analog has a composition in which an atom or an atom group of a certain compound is replaced with another atom or another atom group.

Zerumbone, α-humulene, and β-caryophyllene can be obtained as an extract or a pulverized product of a plant of the ginger family such as ginger or turmeric. Alternatively, zerumbone, α-humulene, and β-caryophyllene can be obtained as an extract or a pulverized product of hop, clove tree, or lavender.

In the present embodiment, an extract from an essential oil component of wild ginger is mainly used as zerumbone, α-humulene, and β-caryophyllene. However, even in the case where a pulverized product is alternatively used, a similar efficacy can be achieved.

In order to confirm that the above substances have an efficacy such as alleviation of the various stresses on a plant or promotion of plant growth, some verification experiments were conducted. Results of the verification experiments will be reported below. In each of the verification experiments, solutions of the above substances were used. A concentration thereof was in a range from 0.01 ppm to 10 ppm, in order to exert a sufficient efficacy on a plant. This concentration was appropriately adjusted for each verification experiment. For comparison, similar verification experiments using sanguinarine were conducted. In such a verification experiment for an identical purpose to the above, a concentration of sanguinarine was set to be identical to those of the above substances.

Embodiment 1

First, the following describes some verification experiments conducted to verify effectiveness of the agent for improving plant growth with respect to Spermatophyta.
(Verification Experiment 1 Verification Experiment for High Temperature Stress: Hydroponics)

A verification experiment for high temperature stress was conducted by use of Japanese mustard spinach. The experiment was conducted in the following procedures.

Seven days after sowing, Japanese mustard spinach seedlings secured with cultivation sponges and grown to have developed true leaves were set in a styrene foam float. The float was floated on a culture solution in a resin container. Furthermore, bubbling was performed with an air pump and a stone. Then, an agent was sprayed onto the leaf surfaces. A liquid fertilizer used was a liquid fertilizer of the Ensi (the Horticultural research station of the Ministry of Agriculture, Forestry and Fisheries of Japan) formulation, which was a general-purpose formulation for vegetable hydroponics developed by the Horticultural Experiment Station in 1960s.

The Japanese mustard spinach seedlings were cultured in a high temperature environment for nine days, during which growth of the seedlings were observed.

Note that the agent used was zerumbone. For comparison, a Japanese mustard spinach seedling sprayed with sanguinarine as an agent and a Japanese mustard spinach seedling sprayed with water containing no active ingredient (hereinafter, such a seedling is called a "control sample") were also cultured. A maximum temperature during the nine days of the culture period was in a range from 30° C. to 43° C. The seedlings of Japanese mustard spinach were cultured in a place with a plenty of sunlight. The number of samples was 40 for each type. A dry weight of 10 samples was measured at a time.

The result of the verification experiment is shown in Table 1.

Note that the reason why the Japanese mustard spinach seedling sprayed with sanguinarine was used as the comparative sample is that, among many substances, sanguinarine has an especially high effect of improving a stress resistance. For example, sanguinarine has approximately 10 times greater stress activity than the agent for giving a plant a stress resistance, especially isothianate that is known to improve a resistance to high temperature stress. Therefore, it was considered that confirming the agent's higher effect than sanguinarine would verify superiority of the agent over the other agents for giving a plant a stress resistance.

TABLE 1

|  | Hydroponics experiment on Japanese mustard spinach (First time) | | |
|---|---|---|---|
|  | Control | Sanguinarine | Zerumbone |
| Weight of 10 samples (g) | 1.460 | 1.554 | 1.729 |
|  | 1.536 | 1.538 | 1.732 |
|  | 1.539 | 1.594 | 1.787 |
|  | 1.566 | 1.610 | 1.792 |
| Average (g) | 1.525 | 1.574 | 1.760 |
| Growth ratio (%) | 100.0 | 103.2 | 115.4 |

The average weights of the Japanese mustard spinach seedlings were compared to one another. The weights of the samples sprayed with sanguinarine were merely approximately 3% greater than those of the control samples. Whether or not sanguinarine had a significant effect is unclear from this. Meanwhile, the weights of the samples sprayed with zerumbone were approximately 15% greater than those of the control samples. This clearly shows that zerumb one had an effect of improving a stress resistance.

Note that, also in the cases where α-humulene and β-caryophyllene were used respectively as the agents, effects almost similar to that of zerumbone were confirmed.
(Verification Experiment 2 Verification Experiment for High Temperature Stress and Low Sunshine Stress: Hydroponics)

Next, under similar conditions to those of the verification experiment 1, another verification experiment was conducted. The number of samples was 60 for each type. Among these, 40 samples were cultured in a place with a plenty of sunlight, whereas the other 20 samples were cultured in a place with almost no sunlight. As well as in the verification experiment 1, a maximum temperature during the nine days of the culture period was in a range from 30° C. to 43° C.

The result of the 40 samples cultured in the place with a plenty of sunlight is shown in Table 2. The result of the 20 samples cultured in the place with almost no sunlight is shown in Table 3.

TABLE 2

|  | Hydroponics experiment on Japanese mustard spinach (Second time-A) | | |
|---|---|---|---|
|  | Control | Sanguinarine | Zerumbone |
| Weight of 10 samples (g) | 1.664 | 1.996 | 2.120 |
|  | 1.957 | 2.027 | 2.176 |
|  | 1.939 | 2.156 | 2.213 |
|  | 1.987 | 2.179 | 2.298 |
| Average (g) | 1.887 | 2.090 | 2.202 |
| Growth ratio (%) | 100.0 | 110.7 | 116.7 |

TABLE 3

|  | Hydroponics experiment on Japanese mustard spinach (Second time-B) | | |
|---|---|---|---|
|  | Control | Sanguinarine | Zerumbone |
| Weight of 10 samples (g) | 1.553 | 1.802 | 2.137 |
|  | 1.597 | 1.873 | 2.163 |
| Average (g) | 1.575 | 1.838 | 2.150 |
| Growth ratio (%) | 100.0 | 116.7 | 136.5 |

The average weights of the Japanese mustard spinach seedlings were compared to one another. In the verification experiment shown in Table 2, the weights of the samples sprayed with sanguinarine were as much as approximately 11% greater than those of the control samples. Furthermore, the weights of the samples sprayed with zerumbone were as much as approximately 17% greater than those of the control samples. This verification experiment was conducted under conditions almost identical to those of the verification experiment 1. Nevertheless, the samples sprayed with sanguinarine, which did not exhibit a significant effect in the verification experiment 1, exhibited a significant effect this time.

As indicated above, the samples sprayed with zerumbone exhibited better growth more stably than the control samples and the samples sprayed with sanguinarine. Meanwhile, although the samples sprayed with sanguinarine exhibited better growth than the control samples, the effect thereof was confirmed to be unstable.

In the verification experiment shown in Table 3, growth of the control samples was significantly poorer than in the verification experiment shown in Table 2. This clearly indicates an effect of a lack of sunshine. Meanwhile, growth of the samples sprayed with sanguinarine was as much as approximately 17% better than the growth of the control samples. Furthermore, growth of the samples sprayed with zerumbone was as much as approximately 37% better than the growth of the control samples. As shown in Tables 2 and 3, the weights of the samples sprayed with zerumbone had almost no difference therebetween. Thus, a stress due to a lack of sunshine was adequately alleviated in these samples.

From the above results, zerumbone was confirmed to give high resistances to high temperature stress and low sunshine stress and to have an effect of growth promotion. Meanwhile, sanguinarine was also confirmed to have an effect of improving the stress resistance. However, the effect of sanguinarine was smaller than that of zerumbone. Furthermore, in a certain case, the effect of sanguinarine was hardly recognizable.
(Verification Experiment 3 Verification Experiment for High Temperature Stress: Soil Culture)

Next, an experiment was conducted to confirm effectiveness of the agent in soil culture of cucumber.

First, seeds of cucumber were sown in culture soil thrown into 15 cm-pots (size-5 pots) such that the seeds have spaces therebetween. The culture soil contains, as fertilizer components, 180 mg/L of nitrogen, 120 mg/L of phosphoric acid, and 220 mg/L of potassium. The soil was adjusted at pH 6.0. Watering was performed every early morning.

Zerumbone was sprayed onto the leaf surfaces of the cotyledons of cucumber seedlings three to four days after germination, and the seedlings were then cultivated for 10 days. Meanwhile, only water was sprayed onto the leaf surfaces of another cucumber seedlings, and the seedlings were then cultivated for 10 days. A growth difference was observed therebetween. Temperature and sunshine conditions were identical to those of the verification experiment 1.

As shown in FIG. 1, the cucumber seedlings having the leaf surfaces sprayed with zerumbone were grown greatly. This exhibits a remarkable effect of giving a resistance to high temperature stress. Spraying zerumbone onto the leaf surfaces of the cucumber seedlings allows the seedlings to be grown greatly in all respects of the weight, the leaf area, the stem length, the root length, and the root amount.
(Verification Experiment 4 Verification Experiment for Acid Stress)

By use of radish sprouts, a resistance to acid stress caused by nitric acid was investigated. Nitric acid was used here, because nitric acid is a main ingredient of general chemical fertilizers and thus the use of nitric acid does not give any effect on a plant other than acid stress.

Zerumbone was sprayed onto the leaf surfaces of the cotyledons of radish sprouts seedlings three to four days after germination, and the seedlings were then cultivated for several days. Meanwhile, only water was sprayed onto the leaf surfaces of another radish sprouts seedlings, and the seedlings were then cultivated for several days. The radish sprouts seedlings thus cultivated were immersed in a pH 2.5 acid solution for one minute.

Slight withering was observed in some portions of the radish sprouts seedlings having the leaf surfaces sprayed with zerumbone. Meanwhile, the whole of the radish sprouts seedlings having the leaf surfaces sprayed only with water withered greatly.

(Verification Experiment 5 Verification Experiment for Alkaline Stress)

Next, by use of radish sprouts, a resistance to alkaline stress caused by potassium hydroxide was investigated. As well as nitric acid, potassium hydroxide is a main ingredient of general chemical fertilizers. Thus, with potassium hydroxide, it is not necessary to consider any effects on a plant other than alkaline stress, and therefore it is possible to properly evaluate an efficacy regarding alkaline stress.

Zerumbone was sprayed onto the leaf surfaces of the cotyledons of radish sprouts seedlings three to four days after germination, and the seedlings were then cultivated for several days. Meanwhile, only water was sprayed onto the leaf surfaces of another radish sprouts seedlings, and the seedlings were then cultivated for several days. The radish sprouts seedlings thus cultivated were immersed in a pH 9.0 acid solution.

As compared to the radish sprouts seedlings having the leaf surfaces sprayed with zerumbone, the whole of the radish sprouts seedlings having the leaf surfaces sprayed only with water withered greatly.

The above results show that zerumbone gives a plant resistance to both acid and alkali. Suitable pH for plant growth is in a range from approximately 5.5 to approximately 6.5. From the above results, it has turned out that zerumbone is capable of reducing the stress significantly even in an environment with pH extremely lower or higher than the suitable range.

(Verification Experiment 6 Verification Experiment for Dry Stress)

By use of cucumber, a resistance to dry stress was investigated.

3 ml of Zerumbone was added to cucumber seedlings immediately after germination. The cucumber seedlings were cultivated for 18 days. Meanwhile, another cucumber seedlings were cultivated for 18 days without Zerumbone added thereto. Throughout the cultivation period, a minimum amount of water was given and watering was conducted a minimum number of times so that the soil surface was always kept dry. Specifically, a small amount of water was given dropwise only when the cucumber seedlings started withering due to advanced drying.

The seedlings of cucumber after 18-day cultivation are shown in FIG. 2. FIG. 2 shows that the zerumbone-added cucumber grew more greatly than the control.

A weight of each of the seedlings was measured. The result of the measurement is shown in Table 4.

TABLE 4

| | Sample No. | Control | Zerumbone |
|---|---|---|---|
| Weight of each seedling (g) | 1 | 2.45 | 3.56 |
| | 2 | 2.40 | 2.70 |
| | 3 | 2.55 | 2.46 |
| | 4 | 2.57 | 3.07 |
| | 5 | 2.78 | 3.33 |
| | 6 | 2.73 | 3.04 |
| | 7 | 2.76 | 3.03 |
| | 8 | 2.92 | 2.76 |
| | 9 | 2.70 | 3.01 |
| T-value (%) | | | 1.32 |
| Average (g) | | 2.65 | 3.00 |
| Weight comparison (%) | | 100.0 | 113.0 |
| F value | | | 0.0776 |

An average weight of the cucumber seedlings sprayed with zerumbone was approximately 13% greater than the control samples. A T-test value thereof was 1.32%. This is below 5%, which is a significance level. Namely, this shows a significant difference clearly.

Instead of zerumbone, α-humulene or β-caryophyllene was added to another cucumber seedlings immediately after germination. Growing states of the cucumber seedlings were measured, and results of the measurement are shown in Tables 5 and 6. Note that, except for the agent, the cultivation conditions used were identical to those of the case where zerumbone was used.

TABLE 5

| | Sample No. | Control | α-humulene |
|---|---|---|---|
| Weight of each seedling (g) | 1 | 2.45 | 2.69 |
| | 2 | 3.01 | 3.02 |
| | 3 | 2.66 | 2.76 |
| | 4 | 2.27 | 2.65 |
| | 5 | 2.98 | 3.03 |
| | 6 | 2.66 | 2.69 |
| | 7 | 2.66 | 2.99 |
| | 8 | 2.84 | 3.21 |
| | 9 | 2.53 | 3.07 |
| T-value (%) | | | 4.66 |
| Average (g) | | 2.67 | 2.90 |
| Weight comparison (%) | | 100.0 | 108.5 |
| F value | | | 0.645 |

TABLE 6

| | Sample No. | Control | β-caryophyllene |
|---|---|---|---|
| Weight of each seedling (g) | 1 | 2.34 | 2.91 |
| | 2 | 3.04 | 3.13 |
| | 3 | 2.82 | 3.53 |
| | 4 | 2.91 | 3.11 |
| | 5 | 2.65 | 3.02 |
| | 6 | 2.94 | 2.89 |
| | 7 | 2.87 | 3.15 |
| | 8 | 2.98 | 3.01 |
| | 9 | 3.08 | 3.13 |
| T-value (%) | | | 2.23 |
| Average (g) | | 2.85 | 3.10 |
| Weight comparison (%) | | 100.0 | 108.8 |
| F value | | | 0.595 |

An average weight of the cucumber seedlings sprayed with α-humulene or β-caryophyllene is 8% or more greater than the control samples. T-test values thereof were below 5%, which is a significance level. Namely, this shows a significant difference clearly.

(Verification Experiment 7 Verification Experiment for Recovering Dry Stress)

Next, radish sprouts seedlings were dried so that the radish sprouts seedlings were severely damaged. Subsequently, adequate water was given to the radish sprouts seedlings. Thus, whether or not the radish sprouts seedlings could be recovered from the damage was verified.

First, radish sprouts were immersed in water during night so that germination thereof was promoted. After germination, radish sprouts seedlings planted in vermiculite were impregnated in a nutrient fluid of the Ensi formulation. The radish sprouts seedlings were cultured at 25° C. for five days. A light period during the culture was six hours. Then, zerumbone was sprayed to the radish sprouts seedlings. Meanwhile, water was sprayed to samples used as a control.

These radish sprouts seedlings were cultured for one more day. Thereafter, the roots thereof were washed so that the vermiculite was removed therefrom. Then, the roots were wiped with a paper towel. The radish sprouts seedlings were then arranged on a tray, and were dried for one night.

The radish sprouts seedlings thus dried were planted in culture soil obtained by blending leaf soil and Akadama soil in a ratio of 4:6 in a pot.

Among the four samples sprayed with zerumbone, three samples were recovered from the dry state.

Meanwhile, among the four samples sprayed with water instead of zerumbone, only one sample was recovered. Furthermore, growth of the recovered sample was poorer than the samples sprayed with zerumbone.

The verification experiments 6 and 7 show that the use of zerumbone can adequately alleviate dry stress on a plant. Not only this, the verification experiments 6 and 7 show that the use of zerumbone has an effect of recovering the damage given by dry stress.

(Verification Experiment 8 Verification Experiment for Low Temperature Stress)

An experiment was conducted to verify an effect of improving a plant's resistance to low temperature stress, the effect being obtained when zerumbone, $\alpha$-humulene, or $\beta$-caryophyllene was used as the agent.

Cucumber was used as a plant.

First, cucumber seeds were immersed in water of 25° C. for 48 hours. Thereafter, two seeds were sown in a cultivation pot. At the time of sowing, 3 ml of a respective liquid agent was added thereto. Then, in the sunlight, the seeds were cultivated for 17 days under a temperature condition of approximately 30° C. A respective liquid agent was sprayed onto the whole leaf surfaces of grown cucumber seedlings. Furthermore, under conditions identical to the above, the cucumber seedlings were cultivated for one day. As a control sample, a cucumber seedling to which only water was added and onto which only water was sprayed was also cultivated under conditions identical to the above.

To the four types of samples in total including the samples cultured with zerumbone, $\alpha$-humulene, and $\beta$-caryophyllene respectively added as the agents in the above-described manner and the control sample, low temperature stress was given in the following procedures.

First, the second leaf from the top was collected from each sample. Then, the leaves thus collected were cut in an almost equal size. The leaves thus cut were put into poly bags together with tap water, and then the poly bags were tightly closed. Then, the poly bags were left at rest for two days in a dark place cooled at −10° C. or 0° C.

Note that, some of the above samples that were cut in the almost equal size were used in this verification experiment. The remaining of the samples thus cut were used also in the below-described tests for verifying other stress resistances.

On the samples removed from the dark places, TTC test (2,3,5-triphenyl tetrazolium chloride test) was conducted. TTC test is a technique for determining an activity of a cell. According to this technique, a cell having a higher activity is dyed redder, whereas a dead cell is hardly dyed.

Among the samples left at rest in the dark place at −10° C., the control sample applied with no agent was completely dead. Meanwhile, all the samples applied respectively with zerumbone, $\alpha$-humulene, and $\beta$-caryophyllene as the agents were dyed slightly. Thus, it was confirmed that a part of the cells in these samples had an activity, namely, was alive.

Among the samples left at rest in the dark place at 0° C., the control sample applied with no agent was dyed slightly. Namely, a part of the cells in the control sample had a weak activity. Meanwhile, the samples applied respectively with zerumbone, $\alpha$-humulene, and $\beta$-caryophyllene as the agents were dyed deeply. Namely, it was confirmed that almost all the cells in these samples had a strong activity.

In the above process in the experiment, the second leaf from the top was collected from each sample as a sample for low temperature stress. The remaining parts of the samples were further cultivated for two days under a fluorescent lamp in a cool place at 4° C. Then, TTC test was conducted on these samples.

Only a very small part of the leaves of the control sample applied with no agent was dyed. Namely, most part of the cells therein were dead. Meanwhile, the leaves of the samples applied respectively with zerumbone, $\alpha$-humulene, and $\beta$-caryophyllene as the agents were dyed deeply except for their peripheries. Thus, it was confirmed that the cells in center parts of the leaves had a strong activity, namely, were alive.

The above result of the experiment shows that the agents of zerumbone, $\alpha$-humulene, $\beta$-caryophyllene are capable of giving cucumber a high resistance to low temperature stress.

(Verification Experiment 9 Verification Experiment for Organic Acid Stress)

With use of some of the samples that were cut in the almost equal size in the verification experiment 8, a resistance to an organic acid was investigated. The verification experiment 4 verified the resistance to general acid stress, i.e., a low pH environment, with use of nitric acid, which is an inorganic acid. Meanwhile, acetic acid, which is an organic acid, was used in this verification experiment.

In the actual agriculture field, organic acids such as acetic acid are widely used for growth promotion and disease prevention for a crop. Pyroligneous acid (a supernatant in a liquid produced by destructive distillation of woods), which is used in organic farming, also contains acetic acid as its main ingredient. However, unlike inorganic acid, organic acid has a high cell permeability. Therefore, if a too high concentration of organic acid is given to a plant, a cell of the plant will be damaged. Especially, as well as formic acid, acetic acid has the smallest molecular weight among the organic acids. Furthermore, acetic acid has a small dissociation rate. Therefore, acetic acid easily penetrates a cell to give a serious damage to the cell. Here, each sample was immersed in a 0.4% acetic acid solution for two hours. On such samples, TTC test was conducted.

As a result, most of the cells in the control sample applied with no agent were dead. Furthermore, a dyed extent of surviving cells therein was small. Thus, the surviving cells had a low activity. Meanwhile, approximately half of the cells in the samples applied respectively with zerumbone, $\alpha$-humulene, and $\beta$-caryophyllene as the agents had an activity. Furthermore, such cells had a high activity. Thus, surviving of the cells was confirmed therein.

As described above, it was confirmed that the above agents improve a resistance to acetic acid, which has the highest cell permeability. From this, it is considered that the above agents are capable of improving resistances to other organic acids adequately.

(Verification Experiment 10 Verification Experiment for Ammonia Stress)

Inorganic nitrogen exists in soil in three forms of ammonia-nitrogen, nitrite-nitrogen, and nitrate nitrogen. Typically, once an organic matter is decomposed, ammonia-nitrogen is first formed. Furthermore, due to effects of nitrate bacteria and/or the like in the soil, ammonia-nitrogen is converted to nitrite-nitrogen, and then to nitrate nitrogen. Ideally, nitrate nitrogen, which is nontoxic, is applied to a plant. However, due to too much fertilization and/or the like, ammonia-nitrogen, which is toxic, may be absorbed in a plant.

Therefore, it is important to improve a resistance to ammonia for healthy growth of a plant.

With use of some of the samples that were cut in the almost equal size in the verification experiment 8, a resistance to ammonia was investigated in this verification experiment. Each sample was immersed in a 1.0% ammonia solution for three hours. On such samples, TTC test was conducted.

As a result, all the cells in the control sample applied with no agent were dead. Meanwhile, a part of the cells in the samples applied respectively with zerumbone, α-humulene, and β-caryophyllene as the agents had an activity. Thus, the cells therein were confirmed to be alive.

(Verification Experiment 11 Verification Experiment for Ultraviolet Ray Stress)

Next, an effect for improving a resistance to light stress was verified. Here, an ultraviolet ray was used. The ultraviolet ray has a shorter wavelength (i.e., a greater energy per photon) than those of visible light and an infrared ray. Therefore, the ultraviolet ray gives a significantly severe damage to a living organism.

This verification experiment used some of the samples that were cut in the almost equal size in the verification experiment 8. The samples were floated in water in petri dishes, and were irradiated with an ultraviolet ray for 24 hours. On such samples, TTC test was conducted.

As a result, all the cells in the control sample applied with no agent were dead. Meanwhile, approximately half of the cells in the samples applied respectively with zerumbone, α-humulene, and β-caryophyllene as the agents had an activity. Thus, surviving of the cells was confirmed therein.

As described above, it was confirmed that the above agents were effective against the ultraviolet ray, which is the severest. Thus, it is considered that the above agents are capable of improving resistances to all kinds of light stress given to a plant in a normal environment.

(Verification Experiment 12 Verification Experiment for Salt Stress)

With use of some of the samples that were cut in the almost equal size in the verification experiment 8, a resistance to a salt was investigated. Each sample was immersed in 1.0% saline water for 24 hours. On such samples, TTC test was conducted.

As a result, a part of the cells in the control sample applied with no agent was dead. Furthermore, a dyed extent of surviving cells therein was small. Moreover, the surviving cells had a low activity. Meanwhile, most of the cells in the samples applied respectively with zerumbone, α-humulene, and β-caryophyllene as the agents were alive. Furthermore, the surviving cells had a high activity.

Thus, the verification experiments 9 to 12 show that each of zerumbone, α-humulene, and β-caryophyllene is capable of giving a plant resistances to various stresses of organic acid stress, ammonia stress, light stress, and salt stress.

(Verification Experiment 13 Comprehensive Verification Experiment in Actual Agricultural Production Field)

Based on the results of the above verification experiments 1 to 12, a comprehensive effect in an actual agricultural production field was verified. For this purpose, a verification experiment was conducted in a vinyl greenhouse in Kyoto city in Japan.

The vinyl greenhouse was a pipe-structure vinyl greenhouse. In the vinyl greenhouse, a deep flow technique device was set, and hydroponics was conducted. The deep flow technique is one technique for hydroponics. According to this technique, a nutrient fluid containing a fertilizer dissolved therein is accumulated in a cultivation bed, and a crop is cultivated only with the nutrient fluid, without using soil.

The cultivation was performed for approximately one month in summer. In the vinyl greenhouse during the days in this period, a maximum temperature was in a range from 28° C. to 44° C., and a minimum temperature was in a range from 24° C. to 27° C.

Leaf lettuce was deliberately selected as a crop to be cultivated, although the leaf lettuce has its growth optimum temperature of 18° C. to 23° C. and, therefore, grows suitably in a cool climate. Since the leaf lettuce has a low tolerance for heat, the leaf lettuce is likely to suffer from various physiological disorders such as unproductive growth, tip burn (tip burn disease), and heterophyll and various diseases such as powdery mildew and root rot. Thus, cultivating the leaf lettuce in summer is generally considered to be difficult.

The following describes specific procedures for cultivation of the leaf lettuce.

<1. Sowing>

Seeds were sown on culture sponge spread on a seedling tray. One day after the sowing, germination was observed.

<2. Spraying of Agent>

10 days after the germination, leaves in five divided test sections were sprayed respectively with zerumbone, α-humulene, β-caryophyllene, sanguinarine, and only water containing no active ingredient.

Thereafter, the sponge was cut into pieces such that each of the pieces had one seedling. The pieces of sponge were set in a styrene foam float such that the seedlings were spaced from each other by 10 cm. The float was floated in the deep flow technique device. As a liquid fertilizer, a liquid fertilizer of the Ensi formulation was used. As a pH adjuster, sodium hydroxide and phosphoric acid were used. During the cultivation period, a pH value was maintained within a range of 6.0 to 6.5.

<3. Transplantation>

20 days after the germination, the leaf lettuce seedlings were transplanted to a styrene foam float such that the seedlings were spaced from each other by 25 cm. The float was floated in the deep flow technique device. The liquid fertilizer and the pH value were equal to those described above.

<4. Harvest and Observation>

Waiting until a harvest size reached a range of 150 g to 180 g in each test section, the leaf lettuce seedlings were harvested. The leaf lettuce seedlings were observed regarding whether or not a physiological disorder or a disease occurred.

The observation was conducted for seven observation items in total including five items regarding a physiological disorder and two items regarding a disease resistance. Specifically, the five items regarding the physiological disorder include heterophyll, unproductive growth, tip burn, a root spread condition, and taste, whereas the two items regarding the disease resistance include powdery mildew and root rot.

The harvest timings and the observation results are shown in Table 7.

TABLE 7

| | | Hydroponics test on leaf lettuce | | | | |
|---|---|---|---|---|---|---|
| | | Control | Sanguinarine | Zerumbone | α-humulene | β-caryophyllene |
| Growing speed | Harvest timing | 38th day after germination | 35th day after germination | 30th day after germination | 32nd day after germination | 33rd day after germination |
| Physiological disorder (quality) | Heterophyll | Occurred in majority of seedlings | Occurred in a part of seedlings | Not occurred | Not occurred | Not occurred |
| | Unproductive growth | Occurred in majority of seedlings | Occurred in a part of seedlings | Not occurred | Not occurred | Not occurred |
| | Tip burn (dead fringes of leaf) | Occurred in a part of seedlings | Not occurred | Not occurred | Not occurred | Not occurred |
| | Root spread condition | Poor | Generally normal | Very good | Generally normal | Very good |
| | Taste | Strong bitterness | No bitterness | No bitterness | No bitterness | No bitterness |
| Disease resistance | Powdery mildew | Occurred | Not occurred | Not occurred | Not occurred | Not occurred |
| | Root rot | Occurred | Occurred | Not occurred | Not occurred | Not occurred |

First, the harvest timing at which the harvest size reached the range of 150 g to 180 g was the 38th day in the control test section, and was the 35th day in the sanguinarine test section. This shows that the growing speed was improved by the spraying of sanguinarine. Meanwhile, in the zerumbone test section, the harvest size reached the range of 150 g to 180 g on the 30th day after the germination. Furthermore, the harvest timing was the 32nd day in the α-humulene test section, and was the 33rd day in the β-caryophyllene test section. Thus, it was confirmed that the growing speed was improved by the spraying of zerumbone, α-humulene, or β-caryophyllene, as compared to the case where sanguinarine was sprayed.

Regarding the physiological disorder, in the control test section, the heterophyll, the unproductive growth, and the tip burn occurred. Further, in this section, the root spread condition was also poor. Also in the sanguinarine test section, the heterophyll and the unproductive growth occurred. Meanwhile, in the test sections sprayed respectively with zerumbone, α-humulene, and β-caryophyllene, no physiological disorder occurred. Further, in these test sections, the root spread condition was far better than in the sanguinarine test section.

Regarding the taste, the leaf lettuce seedling in the control test section had bitterness. This is assumed to be caused by excess production of lactucopirin, which is a bitter substance. Meanwhile, the leaf lettuce seedlings in the test sections respectively sprayed with zerumbone, α-humulene, and β-caryophyllene had no bitterness.

Regarding the disease, in the control test section, the powdery mildew and the root rot occurred. Also in the sanguinarine test section, occurrence of the root rot was observed. Meanwhile, in the test sections sprayed respectively with zerumbone, α-humulene, and β-caryophyllene, occurrence of a disease was not observed. Therefore, these agents are considered to have both of an effect of disease prevention by improving a resistance to the disease and an effect of improving a disease healing power.

As is clear from the above, the use of zerumbone, α-humulene, or β-caryophyllene improved the growing speed of the leaf lettuce, and avoided occurrence of various physiological disorders and diseases. This results in the leaf lettuce having a high quality. It is considered difficult to cultivate the leaf lettuce in summer. However, it was confirmed that the use of these agents enables such cultivation of the leaf lettuce.

It is considered that, in this field testing, many kinds of stresses occurred against the leaf lettuce seedlings. First, the leaf lettuce seedlings were cultivated at a significantly higher temperature than a temperature suitable for their growth. Therefore, certainly, high temperature stress occurred strongly. Furthermore, according to the hydroponics, aeration is not conducted. Thus, it is difficult for roots to breathe, since the roots are always under water. Therefore, certainly, low oxygen stress also occurred. Moreover, the leaf lettuce seedlings were cultivated in the hot sun of summer. Therefore, light stress due to strong sunshine also occurred. In addition, in a natural environment, disease stress caused by bacteria and fungi and insect stress caused by an aphid and/or an insect causing a biting damage such as a green caterpillar are considered to have occurred. Furthermore, the leaf lettuce seedlings were transplanted in the cultivation process. Therefore, stress caused by a sudden change in the cultivation environment due to the transplantation is considered to have occurred.

As such, in the actual agricultural production field, a greater number of stresses occur than in a laboratory environment. Nevertheless, even in such a severe environment, the agent for improving plant growth according to the present disclosure was confirmed to exert adequate efficacies.

Embodiment 2

In Embodiment 1, the description has been given regarding the results of the experiments for verifying effectiveness of the agent for improving plant growth with respect to Spermatophyta. The present embodiment will describe results of experiments for verifying effectiveness of the agent for improving plant growth with respect to Pteridophyta.

As a Pteridophyta, autumn fern was used, which is a representative Pteridophyta often found in, e.g., a glassland and a bright forest. Verification experiments for various stresses were conducted thereon. The experiments were conducted in the following procedures.

The whole leaf surfaces of autumn fern seedlings that were grown sufficiently were sprayed respectively with the agents of zerumbone, α-humulene, and β-caryophyllene. Meanwhile, the leaf surfaces of the control sample were sprayed only with water. After the spraying onto the leaf surfaces, the autumn fern seedlings were cultivated at 25° C. for one day. The leaves were cut in a suitable size, and were then subjected to various stresses. Then, cell activities of the samples were determined by TTC test.

(Verification Experiment 14 Verification Experiment for High Temperature Stress: Pteridophyta)

The leaves that were cut in the suitable size were immersed in tap water of 45° C. for 18 hours. On such leaves, TTC test was conducted.

The control sample applied with no agent was not dyed. Namely, almost all the cells therein were dead. Meanwhile, all the samples applied respectively with zerumbone, α-humulene, and β-caryophyllene as the agents were dyed slightly. Namely, the cells therein had an activity. Thus, these cells were confirmed to be alive.

(Verification Experiment 15 Verification Experiment for Organic Acid Stress: Pteridophyta)

The leaves that were cut in the suitable size were immersed in a 0.4% acetic acid solution for three hours. On such leaves, TTC test was conducted.

The control sample applied with no agent was not dyed. Namely, almost all the cells therein were dead. Meanwhile, all the samples applied respectively with zerumbone, α-humulene, and β-caryophyllene as the agents were dyed slightly. Namely, the cells therein had an activity. Thus, these cells were confirmed to be alive.

(Verification Experiment 16 Verification Experiment for Ammonia Stress: Pteridophyta)

The leaves that were cut in the suitable size were immersed in a 1.0% ammonia solution for 48 hours. On such leaves, TTC test was conducted.

The control sample applied with no agent was not dyed. Namely, almost all the cells therein were dead. Meanwhile, all the samples applied respectively with zerumbone, α-humulene, and β-caryophyllene as the agents were dyed slightly. Namely, the cells therein had an activity. Thus, these cells were confirmed to be alive.

From the above verification experiments, it was confirmed that zerumbone, α-humulene, and β-caryophyllene improve resistances to various stresses also for Pteridophyta.

Embodiment 3

In Embodiments 1 and 2, the descriptions have been given regarding the results of the experiments for verifying effectiveness of the agent for improving plant growth with respect to Spermatophyta and Pteridophyta. The present embodiment will describe results of experiments for verifying effectiveness of the agent for improving plant growth with respect to Bryophyta.

As a Bryophyta, racomitrium moss was used, which is a Bryophyta widely used for greening a park, a rooftop, and a garden. Verification experiments for various stresses were conducted thereon. The experiments were conducted in the following procedures.

Racomitrium moss mats were sprayed respectively with the agents of zerumbone, α-humulene, and β-caryophyllene. Meanwhile, the control sample was sprayed only with water. After the spraying, the racomitrium mosses were cultivated at 25° C. for one day. Then, the samples were subjected to various stresses. Thus, cell activities of the samples were determined by TTC test.

(Verification Experiment 17 Verification Experiment for High Temperature Stress: Bryophyta)

The samples were immersed in tap water of 45° C. for 18 hours. On such samples, TTC test was conducted.

The control sample applied with no agent was not dyed. Namely, almost all the cells therein were dead. Meanwhile, all the samples applied respectively with zerumbone, α-humulene, and β-caryophyllene as the agents were dyed slightly. Namely, the cells therein had an activity. Thus, these cells were confirmed to be alive.

(Verification Experiment 18 Verification Experiment for Organic Acid Stress: Bryophyta)

The samples were immersed in a 0.4% acetic acid solution for three hours. On such samples, TTC test was conducted.

The control sample applied with no agent was not dyed. Namely, almost all the cells therein were dead. Meanwhile, all the samples applied respectively with zerumbone, α-humulene, and β-caryophyllene as the agents were dyed slightly. Namely, the cells therein had an activity. Thus, these cells were confirmed to be alive.

(Verification Experiment 19 Verification Experiment for Ammonia Stress: Bryophyta)

The samples were immersed in a 1.0% ammonia solution for 48 hours. On such samples, TTC test was conducted.

The control sample applied with no agent was not dyed. Namely, almost all the cells therein were dead. Meanwhile, all the samples applied respectively with zerumbone, α-humulene, and β-caryophyllene as the agents were dyed slightly. Namely, the cells therein had an activity. Thus, these cells were confirmed to be alive.

From the above verification experiments, it was confirmed that zerumbone, α-humulene, and β-caryophyllene improve resistances to various stresses also for Bryophyta.

Embodiment 4

As described in Embodiments 1 to 3, the agent for improving plant growth according to the present disclosure alleviates various stresses on a plant. Furthermore, the present agent for improving plant growth also has an effect of improving a power of recovery from a damage when it is given to a plant due to stress.

The present embodiment will describe a method for effectively producing, by taking advantage of the above characteristics, a crop with a high content of a functional component.

Along with increased health awareness of consumers and advancement of cultivation techniques, crops with a higher content of a health functional component are being developed. Except for breed improvement, main methods for producing the crop with a high content of a functional component are two methods described below. Outlines and problems of these methods will be explained in order.

<First Method: Method for Causing Plant to Produce Large Amount of Functional Component>

Most functional components function as defensive substances, by which a plant defenses itself against a stress. Therefore, by artificially giving various stresses to a plant, the plant is caused to produce a larger amount of the functional component.

However, giving the various stresses to a plant results in damage to the plant. Consequently, its inherent quality as a crop, such as appearance, taste, and texture may be impaired. In another case, a yield may be reduced.

An arbitrarily selected stress cannot always cause a plant to produce a larger amount of a certain functional component. Rather, for this purpose, optimum kinds of stresses and optimum ways to give the stresses exist. However, since there is a possibility that the above problems may occur, the kinds of stresses to be given and the ways to give the stresses are limited. For this reason, it has been difficult to develop a plant with an adequate content of a functional component.
<Second Method: Method for Causing Plant to Take in Functional Component>

A crop with a high content of a functional component can be produced by causing a plant to directly take in the functional component from its root and leaf. However, in order to cause the plant to take in the functional component, it is necessary to expose the plant to a high-concentration functional component. Consequently, the plant is damaged (chemical stress) by the functional component itself.

Furthermore, in the case of a certain functional component, it is necessary to use a nutrient fluid whose pH is controlled to be high or low, in order to cause the plant to efficiently take in the certain functional component. However, in this case, the plant is subjected to pH stress.

Thus, when a plant is caused to take in a specific functional component, the plant is subjected to chemical stress or pH stress. This may result in reduction in a quality and a yield. Therefore, there has been a problem of limitation on kinds of functional components to be taken in a plant or difficulty in causing a plant to take in a functional component efficiently.

The problems of both of the above-described two methods can be solved or improved by adding to a plant the agent for improving plant growth according to the present disclosure.

By preliminarily adding to a plant the agent for improving plant growth, the resistances to the various stresses are improved. Consequently, the first method achieves an expanded range of choices for a kind of stress to be given to a plant and a way to give the stress. Thus, it is possible to produce a plant with a higher amount of a functional component.

Meanwhile, the second method achieves an expanded range of choices for a functional component that can be taken into a plant. In addition, the second method allows causing a plant to take in a larger amount of a functional component more efficiently.

The following will summarize mainly advantages of the agent for improving plant growth according to the present disclosure described in Embodiments 1 to 4 above.

The present agent for giving a plant a stress resistance is sesquiterpenes such as zerumbone, α-humulene, and β-caryophyllene. The sesquiterpenes are natural products contained in edible plants. Thus, the present agent for giving a plant a stress resistance secures a high safety. Therefore, the present agent for giving a plant a stress resistance can be used for a crop to be eaten by a human without anxiety. Furthermore, the present agent for giving a plant a stress resistance has an effect of improving resistances to all various stresses that may be subjected to a plant, and therefore has a quite high utility value.

First, because of global warming, an air temperature is increasing year by year. However, use of the present agent improves a resistance to high temperature stress. This makes it possible to grow a plant even with an increased air temperature.

Next, plants have their growth optimum temperatures. Thus, the plants have respective specific temperature ranges in which the plants can grow, namely, respective regions where the plants can grow. However, use of the present agent improves resistances to high temperature stress and low temperature stress. This makes it possible to grow a plant even in a high or low temperature region which is outside the suitable temperature region. Namely, this makes it possible to expand a range of choices for a plant to be grown in each region.

The present agent for giving a plant a stress resistance is also capable of improving a resistance to dry stress. This makes it possible to expand a range of choices for a plant to be grown in an arid region.

Furthermore, the present agent is also capable of improving a resistance to salt stress. This makes it possible to expand a range of choices for a plant to be grown in a coastal region.

Moreover, the present agent may also alleviate pH stress and ammonia stress. This makes it possible to grow a wide variety of plants independently of a quality of soil.

The present agent for giving a plant a stress resistance is capable of improving other various environmental stress resistances. Therefore, even with extensive cultivation in which sufficient management is not performed, it is possible to improve the quality and yield. This makes it possible to reduce a management cost in agriculture.

Meanwhile, horticulture under structure, which is ultimately intensive agriculture, has a problem in a countermeasure against a temperature in summer. However, use of the present agent for giving a plant a stress resistance makes it possible to grow a plant even without any structural countermeasures against temperature. This makes it possible not only to reduce the management cost but also to improve the quality and yield.

Furthermore, the present agent is capable of improving resistances to various stresses that may occur in an artificial cultivation environment such as a plant factory or horticulture under structure. This makes it possible to improve the quality and yield.

Moreover, improving various environmental stress resistances with use of the present agent for improving plant growth results in improvement of a systemic acquired resistance of the plant. Thus, even if the plant is subjected to various diseases, the plant is capable of resisting therewith. This leads to reduction in amounts of agrochemicals. Especially, as confirmed in the verification experiment 7, the present agent for improving plant growth has not only an effect of alleviating a stress but also an effect of improving a power of recovery from a damage. Thus, the present agent is capable of improving a plant's natural healing power from various diseases.

Most of the stresses are stresses that becomes outstanding temporarily. For example, a sudden weather change for a few days temporarily gives a plant high temperature stress, light stress, or dry stress strongly. Due to such strong stress, the cells in the plant are seriously damaged. However, the present agent for improving plant growth has an effect of improving a power of recovery from a damage, and thus allows the plant to grow well again after the strong stress disappears. Therefore, without being affected by the presence or absence of a sudden weather change for a short period, it is possible to harvest crops stably every year.

A pathogen that causes harm to a plant is exterminated by use of a chemical method such as a drug, an acid, or an alkali and/or a physical method such as heat, an ultraviolet ray, or drying. Preliminarily improving plant's resistances to various environmental stresses by use of the present agent for giving a plant a stress resistance allows for use of a stronger extermination method. This expands a range of choices for a method for improving a disease prevention effect.

Especially, the resistances to pH stress and organic acid stress can be improved by the present agent. This expands a range of choices for an agent available for disease prevention and extermination of a pathogen and/or the like.

Especially in the case where a plant is cultivated for rooftop greening or wall greening, the plant is exposed to various kinds of strong stress. In its special environment with extremely little soil, the plant is always exposed to (high and low) temperature stress, dry stress, and light stress. Furthermore, a buffer action in soil does not function. Thus, pH and a chemical substance concentration are likely to have extreme values. Consequently, the plant is subjected to strong pH stress and chemical stress. Furthermore, in addition to pathogens such as virus and fungi, breakout of an insect causing a biting damage such as a gold beetle larva is likely to occur. In such a severe environment for the plant, the plant is cultivated. For this reason, species of plants to be cultivated for rooftop greening or wall greening have been limited to the ones being able to tolerate even such a bad environment. However, with use of the agent for improving plant growth according to the present disclosure, it is possible to extend use of a plant that can be cultivated. Accordingly, it is possible to decorate a window and a rooftop of a building and a house with a variety of plants.

Furthermore, a plant is often subjected to plural various stresses. In the case where plural different agents are applied to the plant to improve resistances to the respective stresses, interaction between the agents is a matter of concern. However, use of the agent for improving plant growth according to the present disclosure, which is effective for the various kinds of stress, eliminates such concern.

Use of the present agent for improving plant growth makes it possible to extend a possibility of a crop with a high content of a functional component. The functional crop refers to a crop containing a high content of a functional component that improves a biological regulation function of a human.

In either of the two methods described in Embodiment 4, the present agent for improving plant growth is effective. The first method achieves an expanded range of choices for a kind of stress to be given and a way to give the stress. Furthermore, it is possible to produce a plant containing a larger amount of a functional component. Meanwhile, the second method achieves a wider range of choices for a functional component that can be taken into a plant. In addition, the second method allows for letting plants to take a larger amount of functional components more efficiently.

As disclosed above, it was found that zerumbone, α-humulene, or β-caryophyllene has an effect of alleviating an environmental stress on a plant, promoting plant growth, or improving the quality. Furthermore, it was confirmed that these substances are suitable for new use as an agent for improving plant growth.

The invention claimed is:

1. A method of cultivating a plant subjected to an environmental stress, comprising:
providing to the plant an agent for improving plant growth, thereby alleviating the environmental stress on the plant and promoting plant growth, the agent consisting of a solution of an extract of a plant of a ginger family, hop, clove tree or lavender,
wherein the concentration of zerumbone in the agent is from 0.01 ppm to 10 ppm,
and
wherein the environmental stress is at least one selected from the group consisting of high temperature stress, low sunshine stress, acid stress, alkaline stress, dry stress, ultraviolet ray stress, and salt stress.

2. The method according to claim 1, wherein said agent is the solution of the extract of a wild ginger.

3. A method of cultivating a plant subjected to an environmental stress, comprising:
providing to the plant an agent for improving plant growth, thereby alleviating the environmental stress on the plant and promoting plant growth,
wherein a concentration of zerumbone in the agent is from 0.01 ppm to 10 ppm, and
wherein the environmental stress is at least one selected from the group consisting of high temperature stress, low sunshine stress, acid stress, alkaline stress, dry stress, ultraviolet ray stress, and salt stress.

4. The method according to claim 3, wherein said agent is an extract of a wild ginger.

5. A method of giving a resistance to an environmental stress to a plant, comprising:
providing to the plant an agent for improving plant growth, thereby alleviating the environmental stress on the plant and promoting plant growth, the agent consisting of a solution of an extract of a plant of a ginger family, hop, clove tree or lavender,
wherein the concentration of zerumbone in the agent is from 0.01 ppm to 10 ppm,
and
wherein the environmental stress is at least one selected from the group consisting of high temperature stress, low sunshine stress, acid stress, alkaline stress, dry stress, ultraviolet ray stress, and salt stress.

6. The method according to claim 5, wherein said agent is an extract of a wild ginger.

* * * * *